United States Patent [19]

Hjelset

[11] Patent Number: 4,795,198
[45] Date of Patent: Jan. 3, 1989

[54] CONNECTOR DEVICE FOR AN UNDERWATER PIPE SYSTEM

[75] Inventor: Kurt J. Hjelset, Alesund, Norway

[73] Assignee: Den norske stats Oljeselskap A/S and Liaaen Engineering A/S, Norway

[21] Appl. No.: 89,412

[22] Filed: Aug. 26, 1987

[30] Foreign Application Priority Data

Aug. 27, 1986 [NO] Norway .................................. 863431

[51] Int. Cl.⁴ .............................................. F16L 21/04
[52] U.S. Cl. ........................................ 285/32; 285/93; 285/325; 285/920; 285/912
[58] Field of Search ................. 285/325, 326, 327, 30, 285/31, 32, 919, 920, 93, 912

[56] References Cited

U.S. PATENT DOCUMENTS

| Re. 27,340 | 4/1972 | Williams et al. | 285/31 X |
|---|---|---|---|
| 2,484,755 | 10/1949 | Smith | 285/30 |
| 3,053,553 | 9/1962 | Browning | 285/912 X |
| 3,999,782 | 12/1976 | Shotbolt | 285/912 X |
| 4,664,419 | 5/1987 | Tan et al. | 285/31 |

*Primary Examiner*—Dave W. Arola
*Attorney, Agent, or Firm*—Bacon & Thomas

[57] ABSTRACT

A connector device for an underwater pipe system which comprises one or more conduits, for connecting pipe sections together or to valves, well heads or similar, whereby such a pipe section comprises an end flange (2) which can be introduced into grooves extending in the transverse direction of a housing (1) by mutual movement of the pipe section and the housing transversely of their longitudinal direction, said housing containing an axially shiftable sleeve unit (7) having a through going duct for each conduit, and said device comprising means for biasing the end flange against surfaces in the grooves. In order to achieve sealing the sleeve unit or units (7) are equipped with at least one main sealing ring (13,19) for each duct, adapted to be pressed against a seat (15) on an end flange, and the sleeve unit or units are locked against rotation and have external threads which cooperate with internal threads in a socket (6) which partly surrounds the sleeve unit or units (7). The socket is locked against axial movement in the housing and is coupled to a worm shaft (5) in order to be rotated, for shifting of the sleeve unit or units, said worm shaft being journaled in the housing and can be controlled from the outside. A sealing bushing (24) may be provided inside of the sleeve unit or units, integral with or fastened to a sleeve unit, adapted to provide sealing for preventing that a medium in a conduit may come into contact with the socket (6) and/or the worm shaft (5).

12 Claims, 4 Drawing Sheets

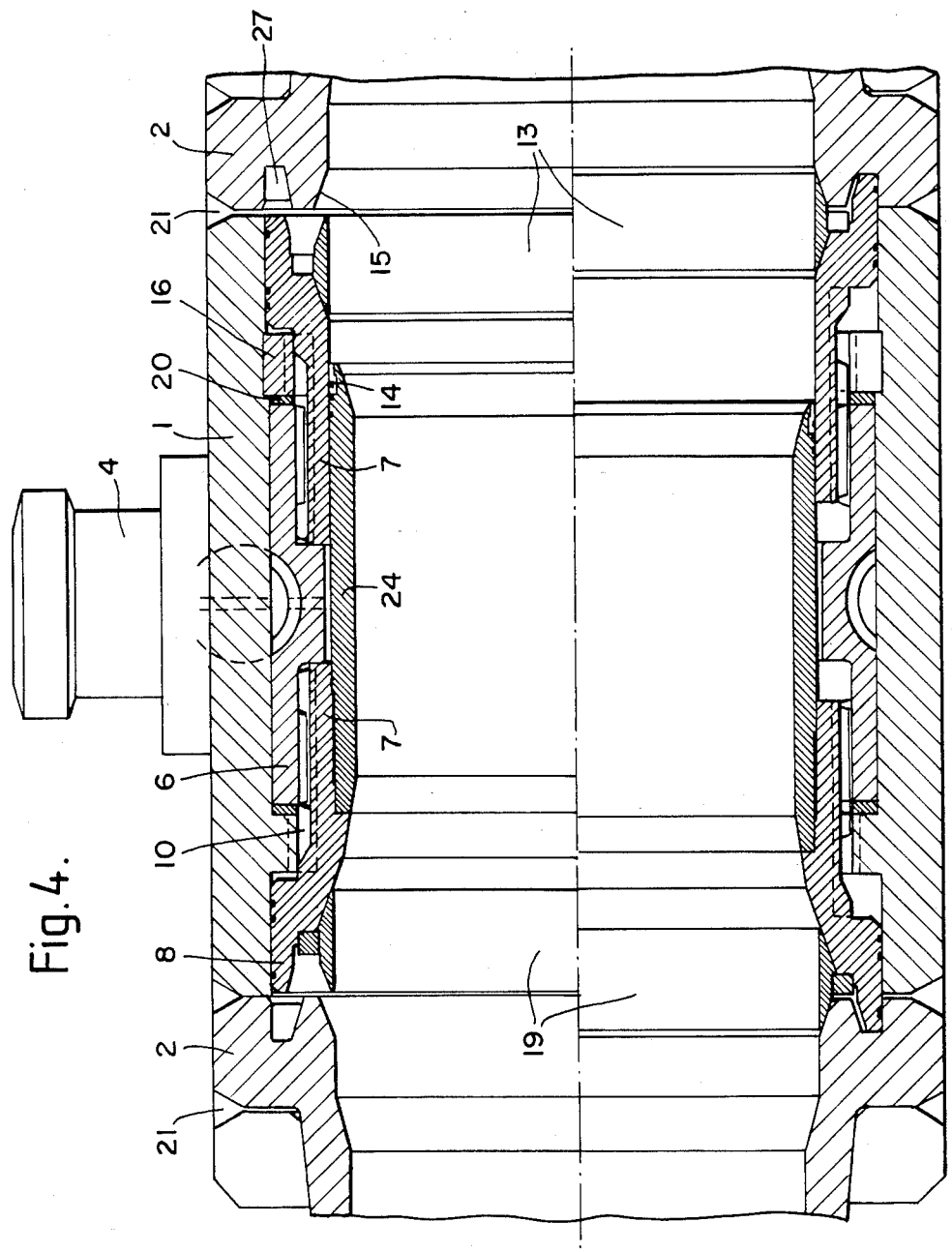

CONNECTOR DEVICE FOR AN UNDERWATER PIPE SYSTEM

The present invention relates to a connector device for an underwater pipe system which comprises one or more conduits, said device being adapted to connect pipe sections together or to connect a pipe section to for instance a valve, a well head or similar, whereby the pipe section or sections comprises or comprise an end flange which can be introduced into grooves extending in the transverse direction of a housing by mutual movement of the pipe section and the housing in a direction perpendicularly to their longitudinal direction, and whereby the housing contains a shiftable sleeve unit having a through going duct for each conduit, said device comprising means for biasing the end flange against surfaces inside the grooves.

It has previously been proposed a connector device of the above kind, whereby the sleeve unit is moved hydraulically in order to bring sleeves of the sleeve unit into the housing having grooves for the end flange. A mechanical biasing device, for instance a wedge device, is used to bias the pipe flange against a surface in the grooves. Moreover, the sleeve unit must be locked against moving away from the coupling position after relief of the hydraulic pressure. In order to achieve both the hydraulic shifting of the sleeve unit and mechanical locking of the unit, in addition to biasing the end flange against the groove surfaces, several operations are necessary for mounting of the necessary auxiliary equipment, and the operations are to be carried out by remote control, because the pipes or other members which are to be coupled together may be situated at a large depth. Therefore, the work is time consuming and difficult.

The object of the present invention is to achieve a connector device which leads to a substantial simplification of the operations necessary to carry out the coupling and to mount auxiliary equipment for this purpose.

In accordance with the invention the above object is achieved with a connector device defined in the succeeding claim 1.

SUMMARY OF THE INVENTION

The invention is based on mechanical coupling and automatic locking in the coupled state, and simultaneously is achieved a biasing force between the sleeve unit or units and the end flange or flanges.

When the housing contains a single sleeve unit the unit is shifted by means of a socket which has inner threads and is prevented in moving axially. When the housing contains two sleeve units the units are shifted simultaneously, by being connected to a respective end of the socket, whereby the threads at the two ends have mutually opposite pitch directions, causing that the sleeve units are shifted axially in mutually opposite directions.

The shifting of a sleeve unit causes that one or more main sealing rings are pressed against a seat or seats on an end flange.

The sleeve unit or units may contain one or more ducts for a through going flow of a fluid, and a number of main sealing rings for each sleeve unit is used which corresponds to the number of ducts, whereby all the main sealing rings are simultaneously pressed into sealing engagement with seats on an end flange or on two end flanges.

The connector device may be unilateral or bilateral. By unilateral is meant that only one end flange is coupled to the housing and that only one sleeve unit is incorporated (which may, however, have one or more ducts). By bilateral is meant that two end flanges are coupled to the respective ends of the housing and that two sleeve units are incorporated.

During the coupling together, after that one or two end flanges have been inserted into grooves in the housing one or more main sealing rings are brought into sealing engagement with respective seats, and the sleeve unit or units are caused to press axially against respective end flanges, in order to exert a biasing force. This is achieved by rotating the worm shaft. Thus, the only operation necessary after that one or two end flanges have been inserted in the grooves in the housing is to mount equipment for rotating the worm shaft.

The invention will hereinafter be explained by means of embodiments shown on the accompanying drawings, showing bilateral connector devices in accordance with the invention, including a single duct and two ducts, respectively, in the sleeve units.

BRIEF DESCRIPTION OF THE DRAWINGS

FIG. 4 shows a longitudinal section through a variant of the embodiment shown in FIG. 1.

DETAILED DESCRIPTION

Figure 1:
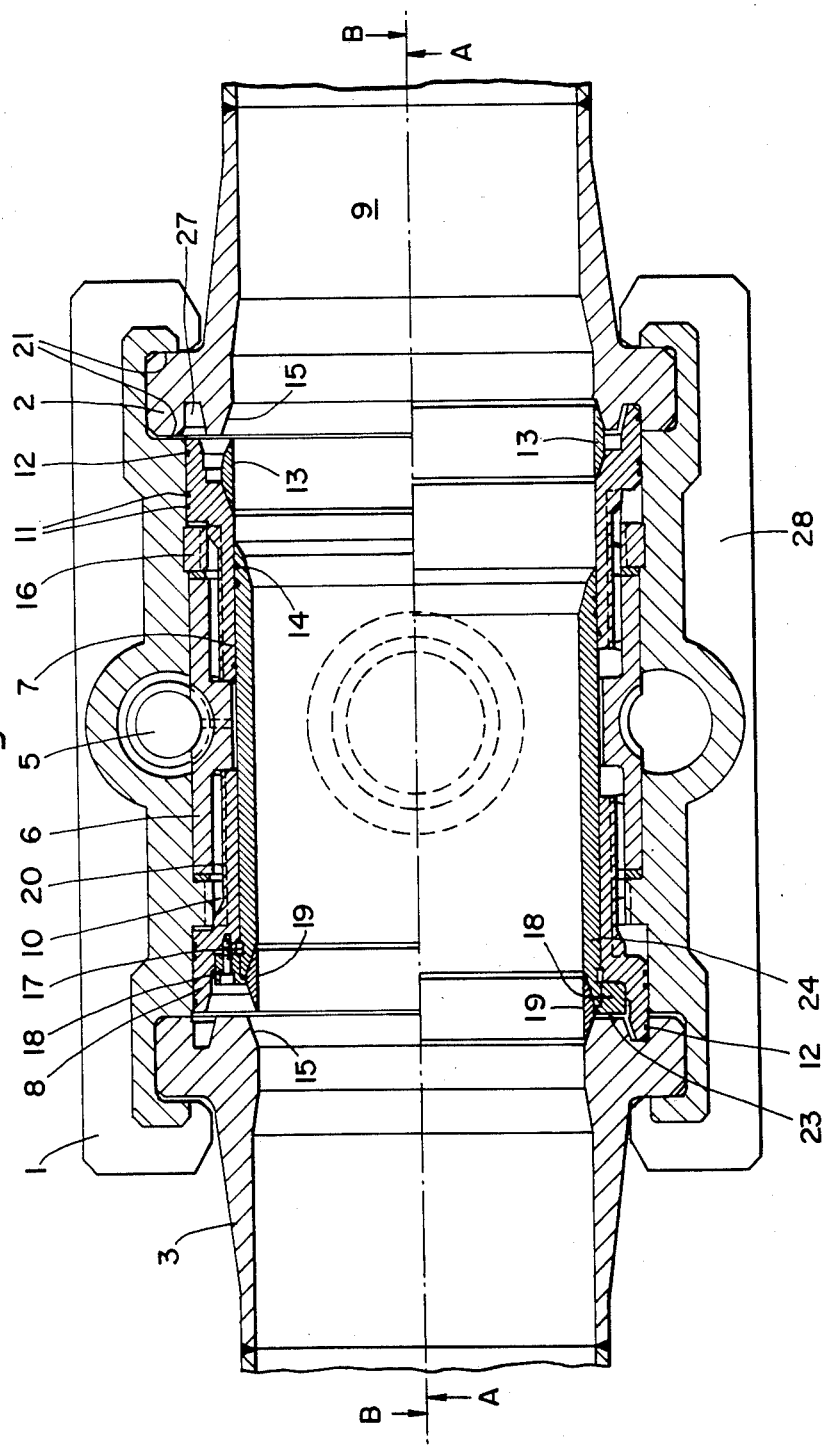
FIG. 1 shows a longitudinal section through an embodiment having a single duct, adapted for coupling together of two pipe ends.

In FIGS. 1 and 4 the upper halves of each Figure show the device before the sleeve units and the main sealing rings have been brought to their sealing positions, while the lower halves show the parts in the sealing positions.

In all of the figures have been used the same reference numerals for equal or equivalent parts.

Figure 2:
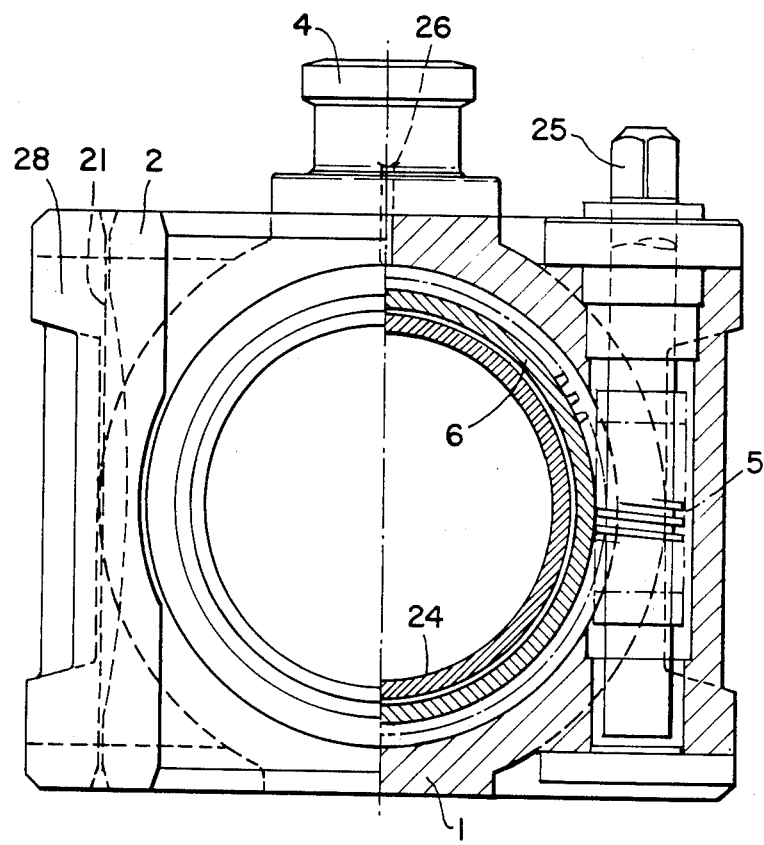
FIG. 2 shows a cross section through the device of FIG. 1.

FIG. 1 shows a housing 1, shown with longitudinal external ribs 28 for reinforcement (see FIG. 2). At each end of the housing are formed grooves 21 in which the end flanges 2 on two pipe ends fit and can be inserted into by movement of the housing perpendicularly to the longitudinal axis. (It is presupposed that the pipes are lying on the sea bed and that the housing 1 is lowered between the pipe ends). During the coupling the sleeve members 7 and the rings 13 and 19 are situated as shown in the upper half of FIG. 1.

The sleeve units 7 have external threads of mutually opposite pitch directions, and the threads mesh with internal threads in a socket 6 which partly surrounds the sleeve units 7. The sleeve units 7 are locked against rotation in the housing 1, by means of wedges 10, while the socket 6 is locked against axial movement by means of thrust rings 20 and locking segments 16. The socket 6 meshes by means of threads with a worm shaft 5 which is accessible from the exterior of the housing 1 (see FIG. 2) in which it is journaled.

The sleeve unit 7 to the right in FIG. 1 is equipped with a main sealing ring 13. A second main sealing ring 19 to the left in FIG. 1 is not mounted on the sleeve unit 7 to the left, but is situated at the end of a sealing bushing 24 fastened to the interior of the sleeve unit 7 by means of a ferrule 18 and screws and a locking ring 17.

The sealing bushing 24, moreover, has a sealing device 14 on a portion where the sealing bushing is in sealing slide contact with the interior of the sleeve unit 7 to the right in FIG. 1.

It will appear that the main sealing ring 13 to the right in FIG. 1 has slightly larger diameter than the main sealing ring 19 to the left in FIG. 1, and that the end flanges 2 on the pipe ends are shaped correspondingly.

As shown in the upper half of FIG. 1 (Section A—A) there is a certain clearance between the end flanges 2 and one side of the grooves 21 in which the end flanges 2 are situated. Consequently there is not an adequate mechanical connection between the end flanges 2 and the housing 1.

When the worm shaft 5 is rotated in the proper direction, starting from the situation shown in the upper half of FIG. 1, the sleeve units 7 are moved away from each other, and the main sealing rings 13 and 19 are moved towards the respective ones of the end flanges 2. The sealing bushing 24 slides in contact with the sleeve unit 7 to the right in FIG. 1 and maintains sealing thereagainst.

At each end of each sleeve unit is a circumferential elongation 8, equipped with sealing rings 11,12 which in the initial position (i.e. in the upper half of FIG. 1) all are contacting the housing 1. Each end flange 2 has an annular groove 27 which is adapted to the elongations 8. The elongation of each sleeve unit 7 is moved into the annular grooves 27, and finally the elongations will press against the bottom of a respective annular groove and thereby press the end flanges 2 against a surface in the grooves 21, in order to bias the end flanges in the grooves 21 (Section B—B), and the sealing ring 12 is in sealing contact against a surface in the groove. Simultaneously sealing engagement between the main sealing rings 13 and 19 and the seats 15 in the respective end flanges 2 is established.

Thus, mechanical tightening and sealing has been achieved merely by rotation of the worm shaft 5.

The movable parts within the housing will be maintained locked in the position shown in the lower half of FIG. 1 (Section B—B), and no auxiliary means are necessary for securing the locking.

It appears from FIG. 1, to the left in the lower half, that the end flanges 2, the main sealing ring 19 and the sleeve unit 7 having the sealing bushing 24 define a closed, annular gap 23. This gap can be utilized for checking that the main sealing ring 19 in fact provides the desired sealing, by introducing a pressurized medium in the gap, through for instance a bore (not shown) in the end flanges.

FIG. 2 shows a cross section through the connector device shown in FIG. 1 and shows in particular that the worm shaft 5, being equipped with a square head 25 for a wrench, is in thread connection with the socket 6, in order to rotate the socket. The Fig. also shows end flanges 2 introduced into grooves 21 in the housing 1 and an attachment member 4 for a gripper device, for lowering the connector device from a surface vessel to the sea bed and possibly also for raising of the connector device. Also a bore 26 in the housing 1 is indicated, adapted for introduction of pressurized oil to the worm shaft and the thread connections.

Figure 3:
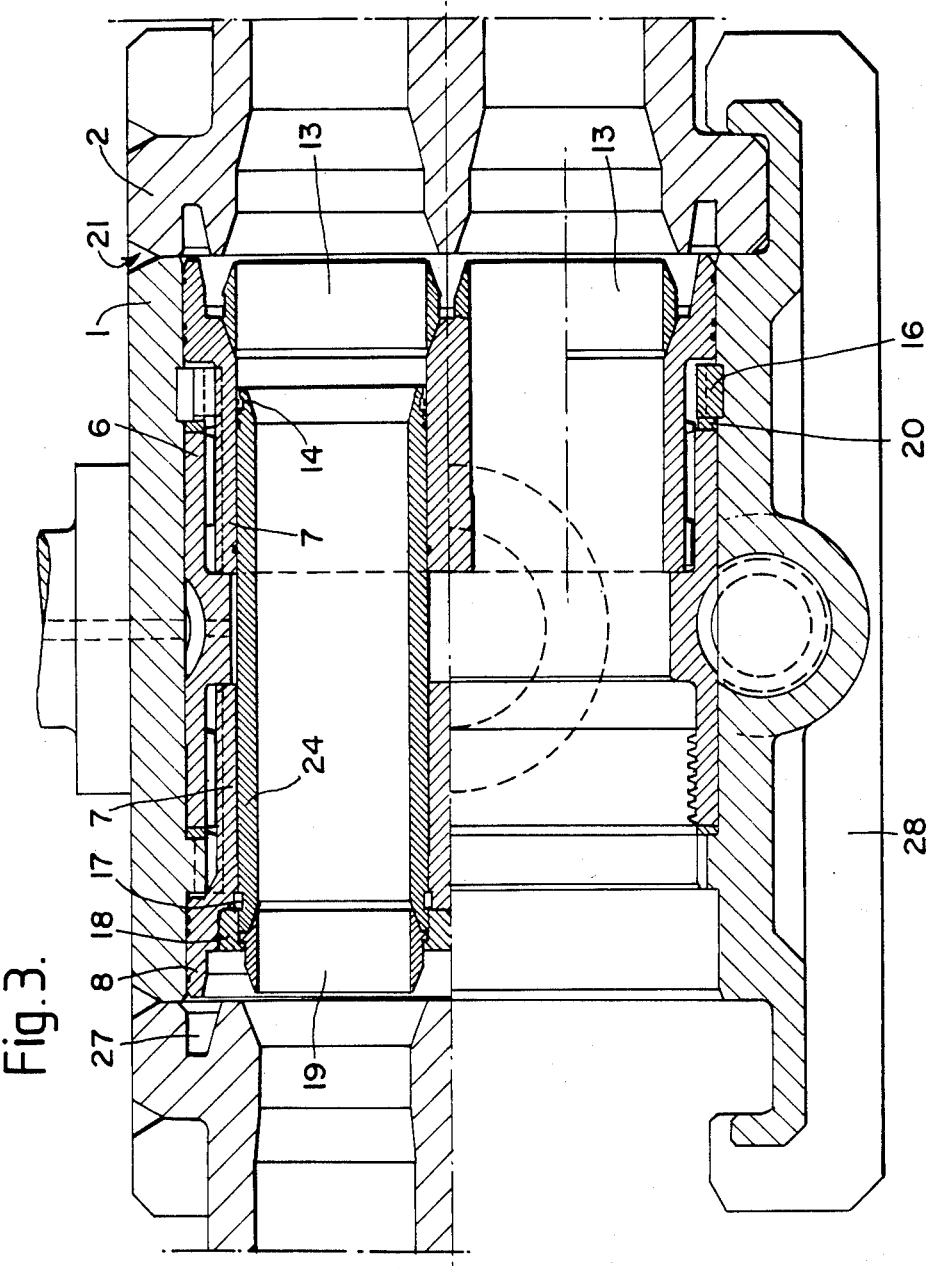
FIG. 3 shows a longitudinal section through an embodiment having two ducts.

FIG. 3 shows an embodiment having two ducts in the end flanges 2 and two corresponding ducts in the sleeve units 7. Consequently, four main sealing rings 13 and 19 are used. Both of the ducts have been formed in the same sleeve units, which can be moved by means of the common socket 6 and a worm shaft.

The upper half of FIG. 3 shows a longitudinal section through the connector device, seen laterally, i.e. a vertical section, while the lower half shows a horizontal section. In both of the sections the movable parts are shown prior to the final connection, after the end flanges 2 have been inserted in the grooves 21.

The functioning is in the principle the same as described above, and the essential difference is that FIGS. 1 and 2 show a single duct through the sleeve units 7, while FIG. 3 shows two ducts.

FIG. 4 shows a variant of the embodiment shown in FIG. 1, seen in vertical longitudinal sections. In the upper half of FIG. 4 the device is shown prior to the final connection, and in the lower half the device is shown after the connection. Reference is made to the explanation of FIG. 1 with respect to the operations during the connection.

In FIG. 4 the main sealing rings 13 and 19 are equal (the same dimensions), and each ring is situated on a respective sleeve unit 7. Thereby also the end flanges 2 are equal, and no provisions need to be taken due to two different end flanges when the housing is mounted, as in the case of the device shown in FIG. 1.

It will be appreciated that disconnection can be performed, with all the embodiments, by rotating the worm shafts 5 in a direction opposite of that used for connection.

During the connection as well as during the disconnection rotation of the worm shaft 5 causes rotation of the socket 6, and the thread connection between the socket 6 and one or two sleeve units 7 causes axial shifting of the sleeve unit or units.

The invention is not limited to a connector device having one or several straight ducts therethrough, as there is no hindrance of using the principle in a branch pipe, for instance of T or Y shape. In such cases it may be necessary to provide more than one socket and a corresponding worm shaft.

In the Figs. the main sealing rings 13 and 19 are shown as so-called AX rings. It will be appreciated that this is merely an example.

A connector device according to the invention is self-locking. Firstly, a very large axial force against the sleeve unit or units 7 is necessary in order to cause rotation of the socket 6, and the self-locking property will be maintained even if the worm shaft 5 is removed after the connection has been performed. The device is even more self-locking when the worm shaft 5 remains in place.

The biasing force between the sleeve unit or units and the end flange or flanges can be chosen so large that the moment of resistance against bending is the same as in the remainder of the pipeline or pipelines.

For bringing the connector device to the sea bed may be used a combination tool capable of holding the housing during the lowering thereof and of performing rotation of the worm shaft. For the purpose of the rotation the tool may comprise a motor. Such a motor, for instance an electric or hydraulic remote control motor, may also be mounted on the housing prior to the lowering thereof from the surface vessel, and also cables or hoses for supply of energy to the motor may be installed prior to the lowering. Thereby, the connector device is ready for the connecting operation after having been lowered.

I claim:

1. A device for connecting a pipe section to an associated device in an underwater pipe system, wherein the pipe section is of the type having an end flange, a peripheral seat and a passageway therethrough, which device comprises:
   (a) a longitudinal housing having at least one transverse groove formed therein, the groove including an engagement surface, wherein an end flange of a pipe section may be introduced into the groove through mutual movement of the pipe section and the housing in a direction perpendicular to their respective longitudinal axes;
   (b) at least one shiftable sleeve unit disposed within the housing and provided with external threading and a duct for a passageway of the pipe section;
   (c) a main sealing ring disposable in engagement against a peripheral seat of the end flange;
   (d) a socket disposed within the housing, the socket at least partly surrounding the sleeve unit and including internal threading engagable with the external threading of the sleeve unit;
   (e) means for locking the sleeve unit against rotation within the housing;
   (f) means for locking the socket against axial movement within the housing; and
   (g) worm shaft journaled in the housing and operably coupled to the socket, the worm shaft being controllable from the exterior of the housing to rotate the socket for moving the sleeve unit and main sealing ring toward the end flange of the pipe section and biasing the end flange against the engagement surface of the groove.

2. The device of claim 1 further including a sealing bushing within the sleeve unit for preventing fluid flowing through the passageway of the pipe section from contacting the socket and the worm shaft.

3. The device of claim 2 wherein the main sealing ring is mounted at one end of the sealing bushing.

4. The device of claim 2 wherein the sealing bushing includes at least one sealing ring for sealing the bushing against the sleeve unit.

5. The device of claim 1 wherein the means for locking the sleeve unit against rotation within the housing includes a wedge.

6. The device of claim 1 wherein the means for locking the socket against axial movement within the housing includes a thrust ring and a locking segment.

7. The device of claim 1 further including a second shiftable sleeve unit, the ducts of the sleeve units being disposed in coaxial alignment, the external threadings of the sleeve units being of mutually opposite pitch directions, and the socket including corresponding internal threadings engageable with the opposite pitch threadings for simultaneously moving the sleeve units in opposite directions.

8. The device of claim 7 further including a second sealing ring disposable into engagement against a seat of an end flange of a second pipe section.

9. The device of claim 1 wherein the sleeve unit further includes an annular protrusion for engagement against the end flange of the pipe section when the main sealing ring is disposed into engagement against the seat of the end flange.

10. The device of claim 9 wherein the protrusion is disposable within an annular groove formed in the end flange of the pipe section when the end flange is biased against the engagement surface of the transverse groove formed in the longitudinal housing.

11. The device of claim 10 wherein the main sealing ring is disposed radially and interiorly of the protrusion for defining a closed annular gap between the protrusion, the end flange, and the main sealing ring when the main sealing ring is disposed into engagement against the seat of the end flange, and further including a passage provided in the housing for connection to a means for supplying pressurized medium to check the tightness of the main sealing ring.

12. The device of claim 1 wherein the sleeve unit further includes a plurality of sealing rings for sealing the sleeve unit against the housing.

* * * * *